July 14, 1931.  S. BUTSKO  1,814,240
MACHINE FOR CUTTING PEARL BUTTON STOCK
Filed Sept. 16, 1929  6 Sheets-Sheet 1

INVENTOR
Stephen Butsko.
BY
John J. Thompson
ATTORNEY

July 14, 1931. S. BUTSKO 1,814,240
MACHINE FOR CUTTING PEARL BUTTON STOCK
Filed Sept. 16, 1929 6 Sheets-Sheet 2

INVENTOR
Stephen Butsko.
BY
John J Thompson
ATTORNEY

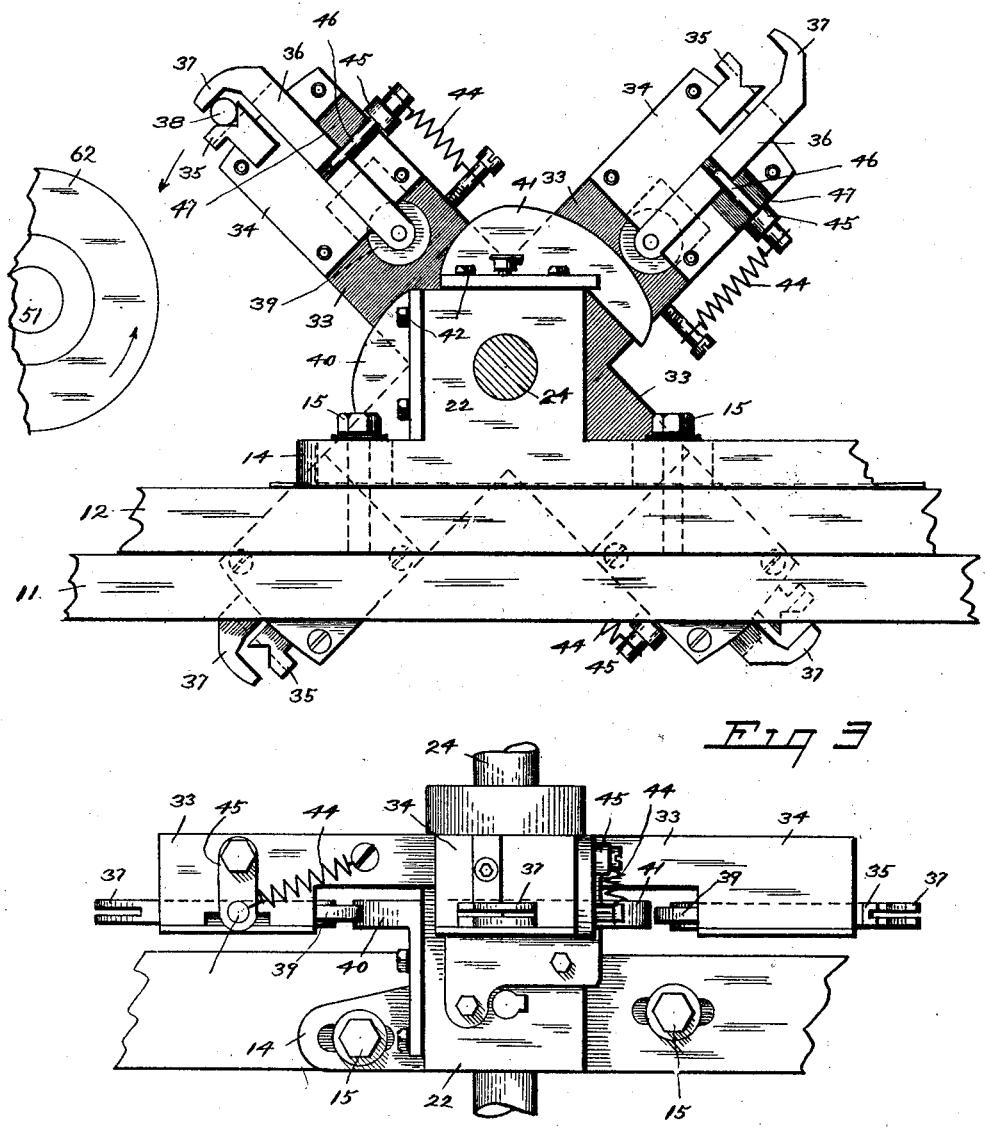

July 14, 1931.    S. BUTSKO    1,814,240

MACHINE FOR CUTTING PEARL BUTTON STOCK

Filed Sept. 16, 1929    6 Sheets-Sheet 4

INVENTOR
Stephen Butsko.
BY John J. Thompson
ATTORNEY

July 14, 1931.  S. BUTSKO  1,814,240

MACHINE FOR CUTTING PEARL BUTTON STOCK

Filed Sept. 16, 1929   6 Sheets-Sheet 5

Inventor
Stephen Butsko.
By his Attorney
John J. Thompson

July 14, 1931.  S. BUTSKO  1,814,240
MACHINE FOR CUTTING PEARL BUTTON STOCK
Filed Sept. 16, 1929   6 Sheets-Sheet 6
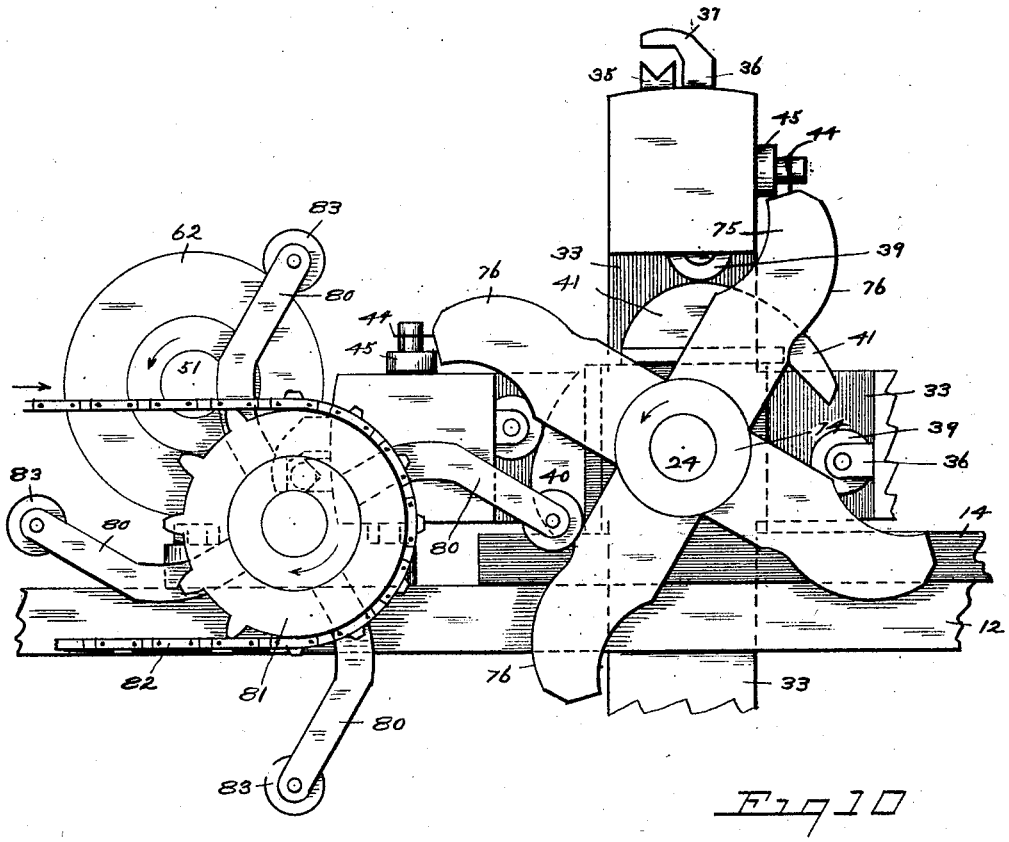
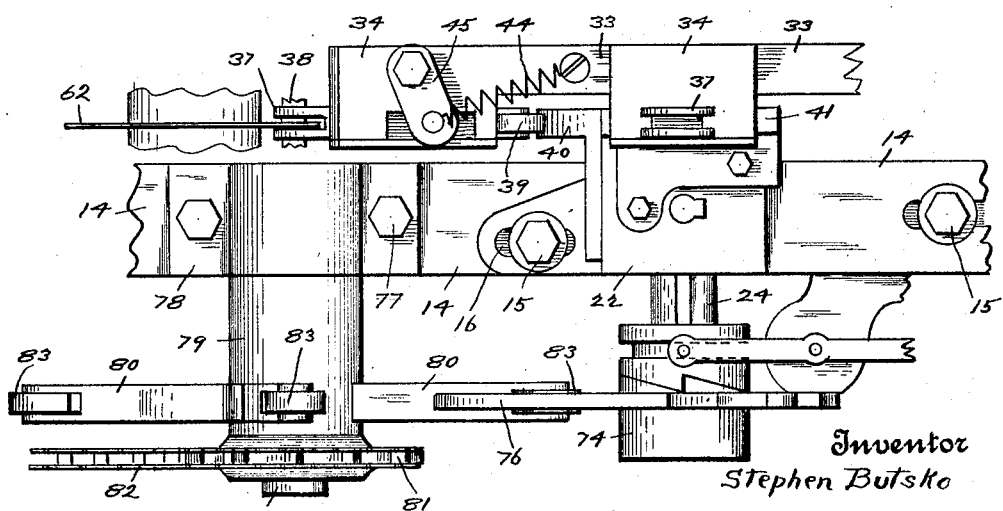
Inventor
Stephen Butsko
By his Attorney Patented July 14, 1931

1,814,240

UNITED STATES PATENT OFFICE

STEPHEN BUTSKO, OF POUGHKEEPSIE, NEW YORK, ASSIGNOR, BY MESNE ASSIGNMENTS, TO PIONEER PEARL BUTTON COMPANY, OF POUGHKEEPSIE, NEW YORK, A CORPORATION OF NEW YORK

MACHINE FOR CUTTING PEARL BUTTON STOCK

Application filed September 16, 1929. Serial No. 393,003.

My invention relates to a machine for dividing fresh water pearl stock (that is the blanks which have been cut from the shell) into two parts, or button blanks, thus increasing the production of button blanks from the pieces of pearl stock one hundred per cent over the present method of forming the blank by grinding down the sides of the stock to the desired thickness for a button blank.

The stock is circular in form as cut from the fresh water shell and is comparatively thin as compared with that cut from the ocean pearl shell, and owing to the irregular and rough outer end of the stock which has formed a part of the outer surface of the shell, they can only be used for making two button blanks, and if divided by splitting the resulting parts are apt to be wedge shaped and not contain sufficient stock to form a perfect button.

In the severing or dividing of pearl stock on a plane with its grain or strata, attempts have been made to effect the cutting with steel saws, or steel disks having fine notches formed in their periphery, said saws being rotated at the usual speed required for cutting metal, but owing to the peculiar characteristics of the shell, this method has resulted in broken saws, etc., and it has been found that the proper cutting medium is a thin disk of abrasive material known in the trade as a "rubber wheel", and rotated at high speed, about 13,000 R. P. M., and cooled by a water jet.

While I have here shown and described the cutting wheel as mounted upon a spindle driven by a belt from a jack shaft, it is to be understood that the cutting wheel may if desired be mounted directly upon the shaft of a motor, or driven in any suitable manner. Also that while the pearl stock is shown as cylindrical in cross section this may also be of any desired shape or size, the gripping jaws being changed to conform thereto.

The object of the present invention is to provide in a machine of this class means whereby fresh water pearl stock of the required thickness for dividing may be held by its periphery or sides, fed to a high speed rotating cutter and thereby cut into two parts at right angles to its axis.

Another object of the invention is to provide a machine semi-automatic in its action, simple of operation, containing few parts and rapid, and also in which the feed of the stock to the cutter may be at a constant speed, or if desired at a variable speed; that is the speed reduced during the hardest part of the cut.

With these and other objects in view, my invention comprises certain construction and combination of parts as will hereinafter be fully described and claimed and fully illustrated in the accompanying drawings in which like figures of reference refer to corresponding parts in all of the views, but it is understood that slight changes may be made without departing from the spirit of the invention.

In the drawings:—

Figure 3 is an enlarged detail view of part of the holding and feeding device, shown in elevation.

Figure 4 is a top plan view of the same, many of the parts not being shown that go to make up the machine.

Figure 10 is a side elevation of an enlarged partial detail view of a device for imparting a variable feed to the stock during the operation of cutting.

Figure 11 shows a top plan view of the same.

Referring to the drawings:—

Figure 1:
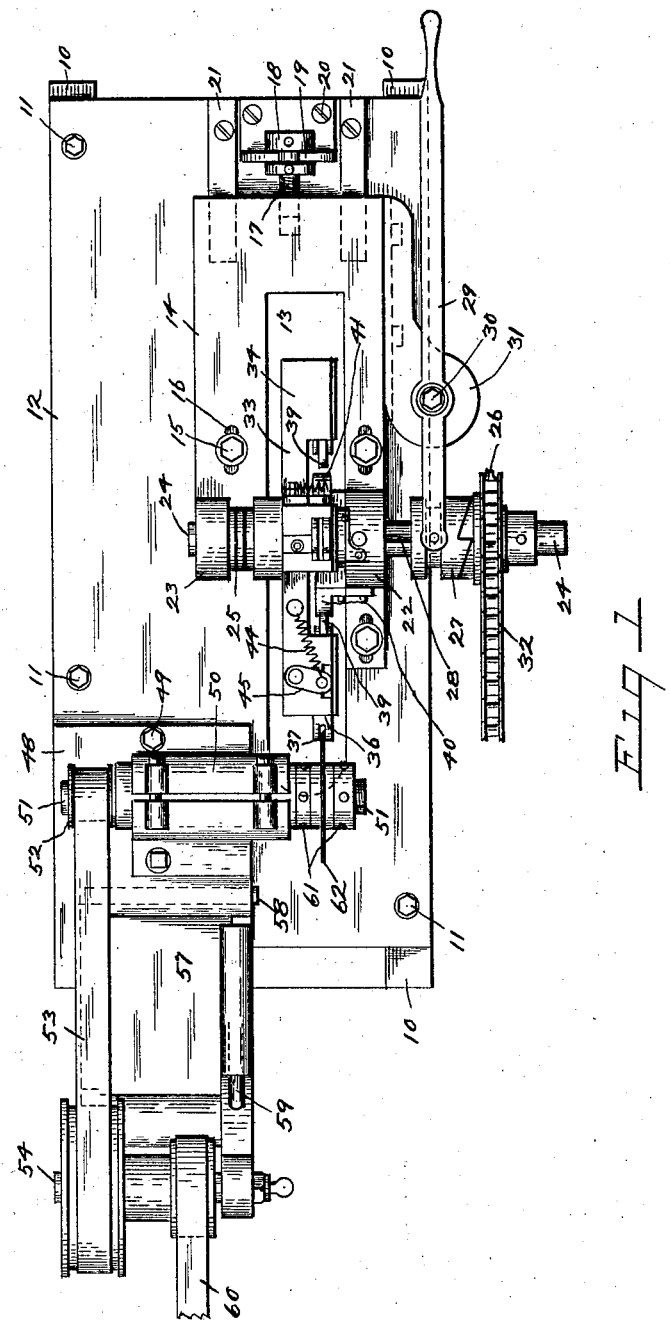
Figure 1 is a top plan view of a machine for this purpose, embodying my invention.
Figure 2:
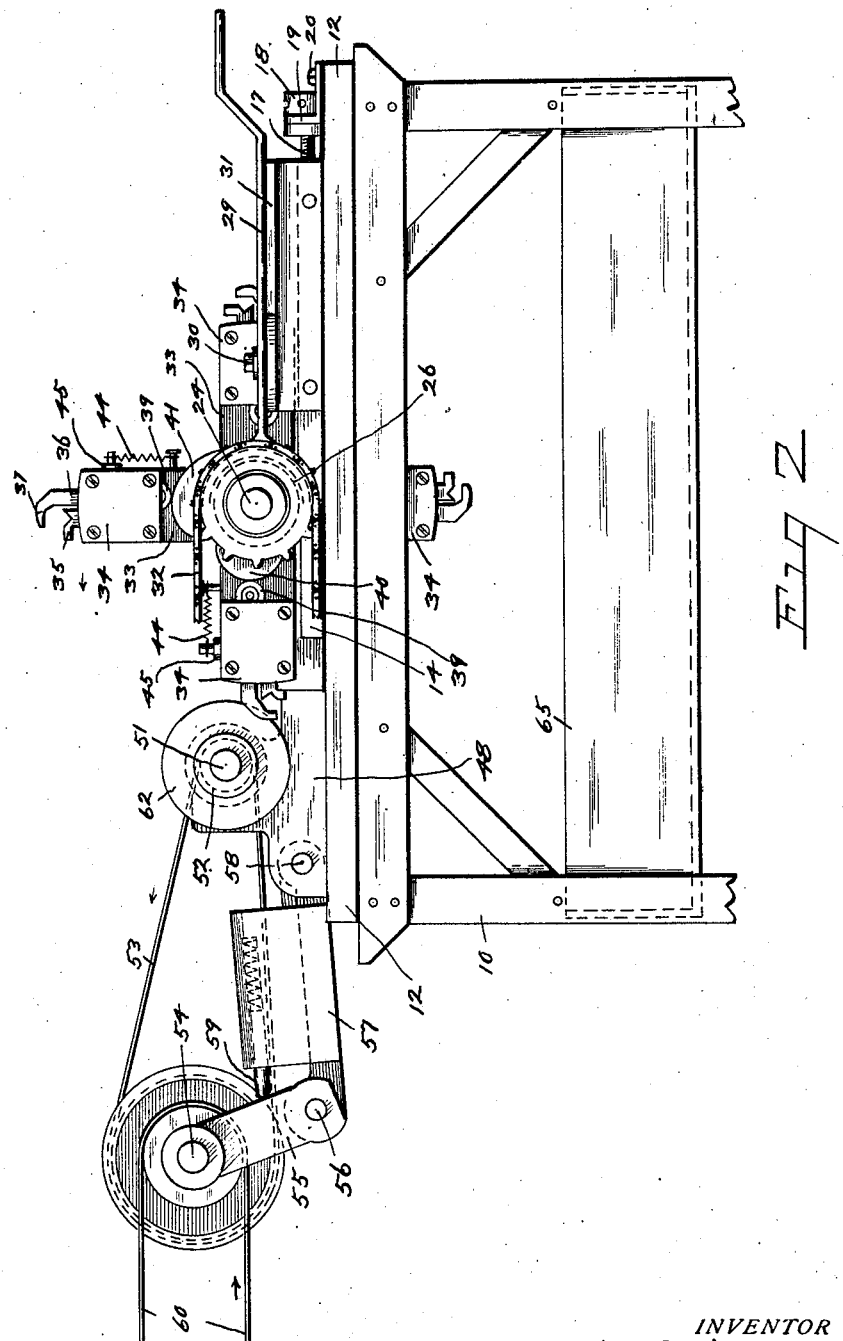
Figure 2 is a front elevation of the same.
Figures 5, 6:
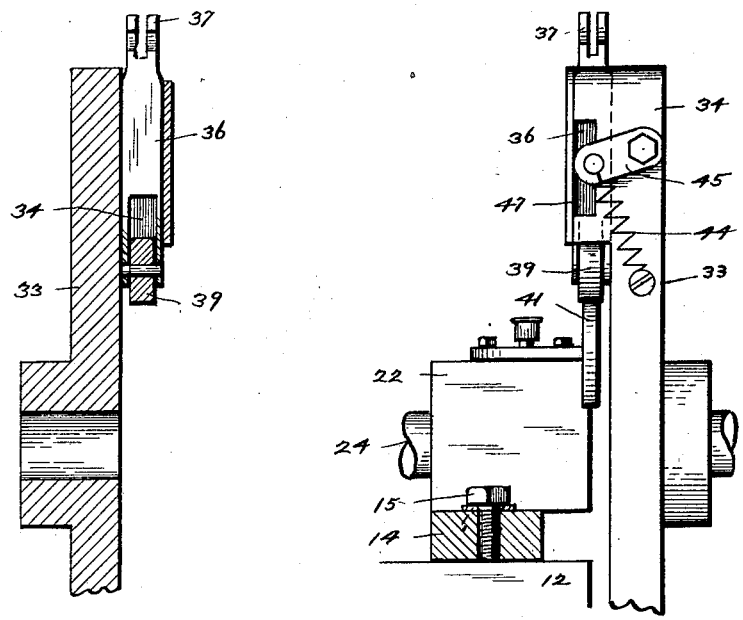
Figure 5 is a detail enlarged sectional view of one of the holding and feeding arms.
Figure 6 shows a partial side view of one of said arms.

The machine comprises a frame or standard 10, upon which is mounted by the bolts 11 the bed plate 12, formed with the opening 13, and upon said base plate 12 is mounted in an adjustable manner the U-shaped base 14 by the bolts 15 placed in the slots 16 and threaded into the plate 12, while as an adjusting means the screw 17 is provided threaded into the end of the base 14 and formed with a necked head 18 held by a notched plate 19 secured by the screws 20 to the plate 12; said base 14 being guided by the guide strips 21.

The base 14 is formed with the two bearings 22 and 23, within which is rotatably mounted the shaft 24 on the thrust bearings 25; said shaft being driven by the sprocket wheel 26 mounted thereon through the clutch 27 mounted on said shaft 24 and sliding on the spline 28; said clutch being operated by the hand lever 29 which is pivoted as at 30 to the bracket 31 secured to the base 14; while said sprocket 26 is driven by the chain 32 from some suitable means.

Upon said shaft 24 and between the bearings 22 and 23, and the sides of the base 14 and within the opening 13 is mounted one or more arms 33 which are formed with heads 34 within which are secured a stationary jaw 35 formed with a V-shaped end, and a movable jaw member 36 having a head 37 to coact with the stationary jaw to hold the pearl stock 38 and a roller 39 adapted to ride upon the face of two cams 40 and 41 which are attached to the bearing 22 by the screws 42 in the path of the travel of said arms 33, for the purpose of opening said jaws to receive the pearl stock, closing the same on the stock to hold the same during the act of cutting and again release the stock to eject it; the jaws being normally retained in a closed position by the action of a spring 44 having one end attached to the arm 33 and the other end secured to the outer end of a pivoted arm 45 mounted on said arm 33 and provided with a stud 46 engaging the movable jaw member 36 and operating in a slot 47 formed in said head 34 (see Figures 3 and 4).

The cutting means as here shown comprises a base 48 mounted on the base plate 12 by the bolts 49 and formed with a bearing 50 within which is mounted a spindle 51 being driven by a pulley 52 secured thereon and rotated by a belt 53 from a jack shaft 54 mounted in the swinging arm 55 pivoted as at 56 to the link plate 57 which is also pivoted as at 58 to the base 48; this construction acting as a belt tightener as also is the spring actuated plunger 59 mounted in the link 57 and bearing against the arm 55; said jack shaft being in turn driven by the belt 60 from some suitable source of power.

On the forward end of the spindle 51 are threaded the adjusting collars 61, between which is clamped the cutting blade or disk 62 which is of abrasive material and very thin. This cutter being in line with the center of the jaws 35 and 36 and passing through an opening or slot 63 formed therein.

At a suitable location above the cutter may be located a water jet (not shown) and the frame 10 is supplied with a drip pan 65 to receive the water and the cut blanks as they drop from the jaws.

Figure 7:
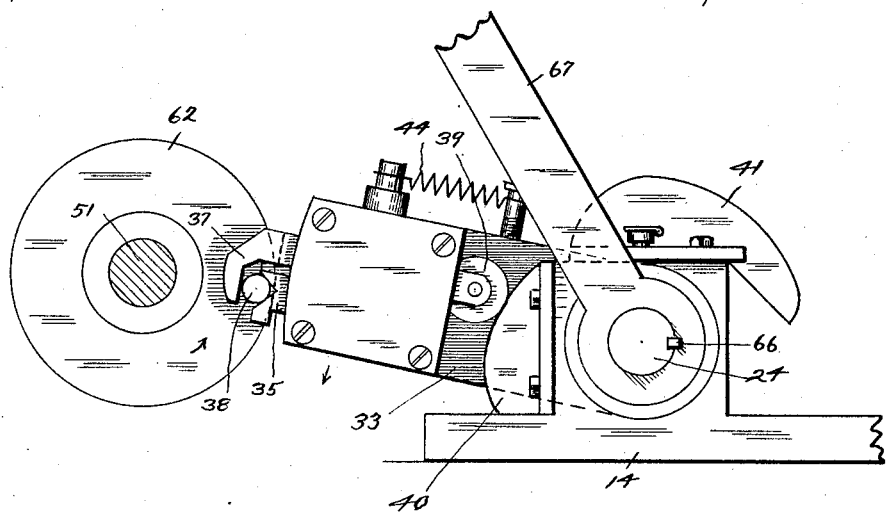
Figure 7 shows in connection with the cutting wheel, of a single holding arm, designed to be operated or fed by hand.

Referring to Figure 7, only one arm 33 is shown as attached to the shaft 24, no clutch, sprocket or chain being employed, and upon this shaft is also secured by a key 66 a hand lever 67 by the action of which the arm 33 may be rocked back and forth to bring the roller 39 over the cams 40 and 41 to open and close the jaws during the period of loading, feeding and cutting.

Figure 8:
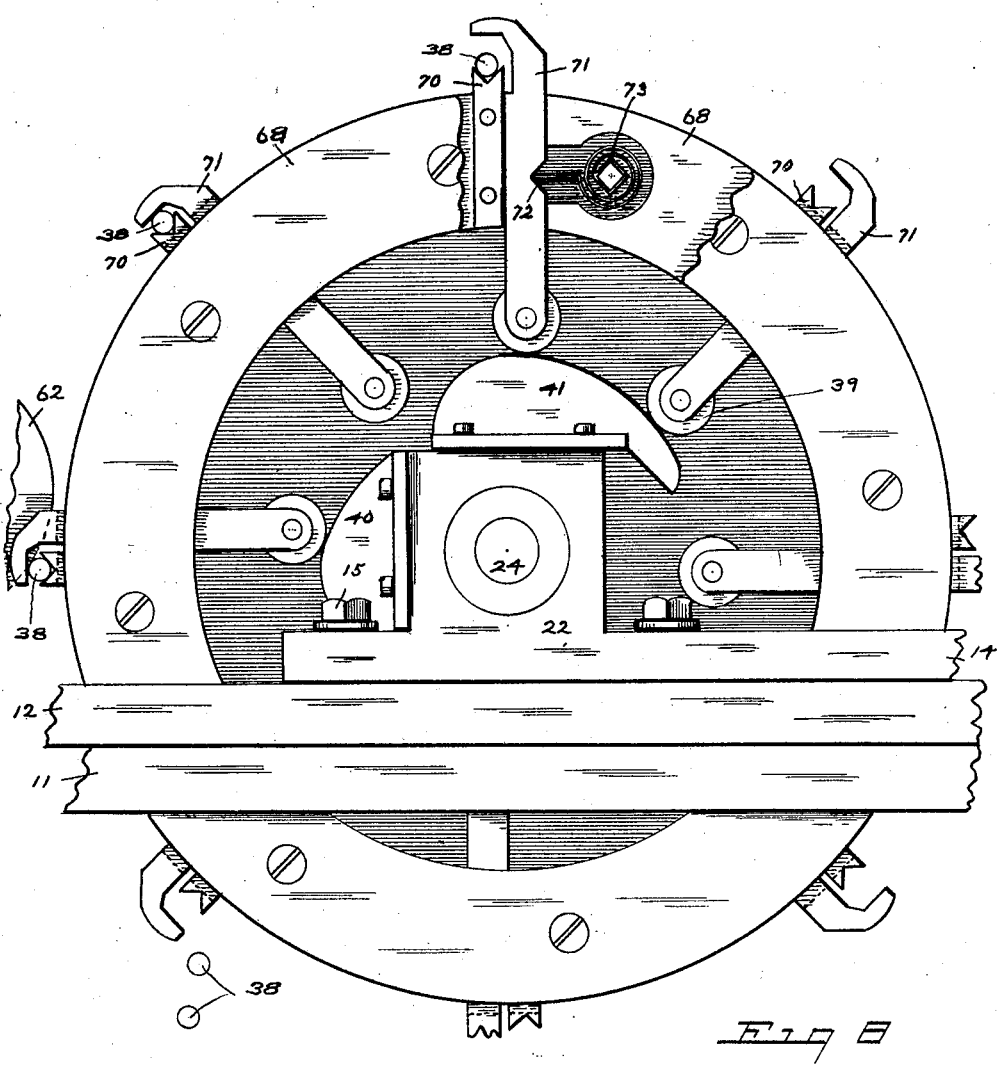
Figure 8 shows a modified form of holder and feeder in the form of a circular plate on which is mounted a series of the stock gripping means.
Figure 9:
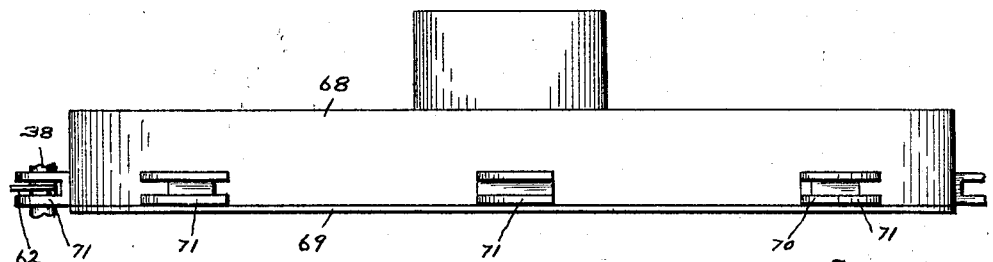
Figure 9 is a top plan view of the same.

In the modified form of holder shown in Figures 8 and 9, the holder comprises a circular plate 68 secured to the shaft 24 and formed with a flange 68 covered by a ring plate 69, and having mounted within said flange in radial relation to the circular plate 68 a series of stationary jaws 70 and movable jaws 71 actuated by the springs 73 mounted in the recesses 72; the movable jaws being provided with the rollers 39 for engagement with the cams 40 and 41.

In the mechanism above described it will be seen that the holders are rotated with a constant speed, but it may be desirable to vary this speed during each cut; that is reduce the speed of the feed during the hardest part of the cut, and to accomplish this I have shown in Figures 10 and 11, a device whereby this may be accomplished, and which comprises in place of the sprocket wheel 26 a hub 74 mounted upon shaft 24 and having the same number of arms 75 as there are feeding arms 33 employed, and said arms 75 are formed with cam faces 76.

Adjacent thereto and secured to the plate 14 by the bolts 77 is a bearing bracket 78 within which is mounted a stud on which is rotatably mounted a spider 79 having the same number of curved arms 80 as there are arms 75; this spider being driven by a sprocket 81 and chain 82 from some suitable source of power.

The ends of the spider arms 80 are bifurcated and have mounted therein the rollers 83, which as the spider is rotated in the direction shown will engage with the cam faces 76 and rotate the shaft 24 with an intermittent and variable speed, which enables the holders to be at rest for an instant during the operation of loading, start and finish the cut at a fair rate of speed and yet have their speed reduced during the hard part of the cut thus relieving the strain on the cutter.

It is also to be understood that in place of the stock being fed to the cutting means, that the stock may be brought into cutting position and the saw fed to and from the stock by some suitable means; also that in place of loading the jaws by hand, that a suitable hopper or other automatic loading device may be employed.

Having thus described my invention, what I claim as new and desire to secure by Letters Patent, is:—

In a machine for dividing fresh water pearl stock into two parts, comprising a base having alined bearings and formed with a central opening, a shaft rotatably mounted in said bearings and means for rotating the same, arms carried by said shaft, heads formed on the ends of said arms and provided with a radial slot, a stationary jaw projecting from the end of said head, a movable jaw slidably mounted in the radial slot and coacting with the stationary jaw, a roller carried by the rear end of said movable jaw, cams mounted on one of the bearings in the path of said roller and adapted to contact with said roller to operate the movable jaw to open the same, said movable jaw being formed with a transverse slot, an arm pivoted to the side of said head, said head formed with an opening in the side thereof, a pin depending from said arm and extending through said opening and engaging the slot in said movable jaw, and a spring secured to said arm and to said head for normally retaining the jaws in a closed position.

In testimony whereof I affix my signature.

STEPHEN BUTSKO.